(No Model.)
C. F. PONTIOUS
BALL BEARING.
No. 554,004. Patented Feb. 4, 1896.
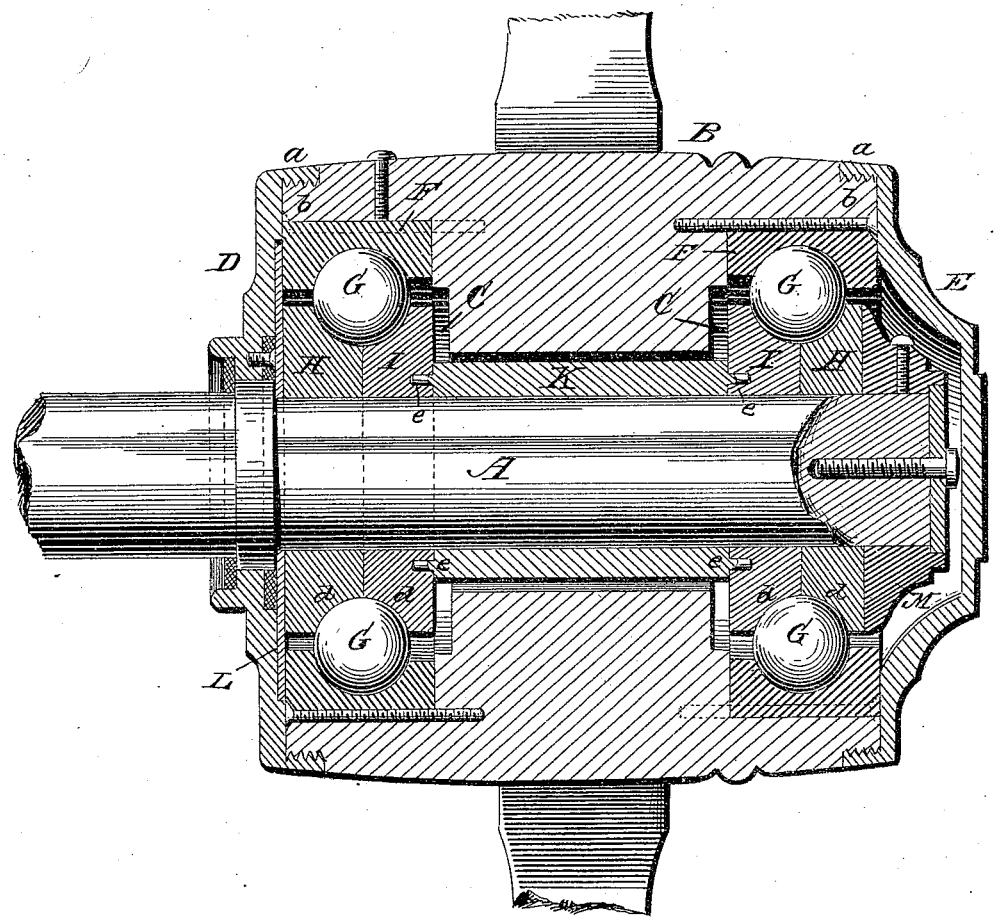
Witnesses
J. Williamson
Jos. L. Bradley
Inventor
Cornelius F. Pontious.
per Chas. H. Fowler
Attorney.

UNITED STATES PATENT OFFICE.

CORNELIUS F. PONTIOUS, OF PLYMOUTH, INDIANA.

BALL-BEARING.

SPECIFICATION forming part of Letters Patent No. 554,004, dated February 4, 1896.

Application filed November 21, 1895. Serial No. 569,651. (No model.)

*To all whom it may concern:*

Be it known that I, CORNELIUS F. PONTIOUS, a citizen of the United States, residing at Plymouth, in the county of Marshall and State of Indiana, have invented certain new and useful Improvements in Ball-Bearings; and I do hereby declare that the following is a full, clear, and exact description of the same, reference being had to the annexed drawing, making a part of this specification, and to the letters of reference marked thereon.

The present invention has relation to certain new and useful improvements in that class of ball-bearings employed in shafting or for the axles of vehicles or for other purposes where a bearing of this character would be found advantageous; and the invention consists in a bearing constructed substantially as shown in the drawing and hereinafter described and claimed.

The accompanying drawing represents a longitudinal section of my invention, showing it applied to the axle of a vehicle, said axle and the bearing-balls being shown in elevation.

In describing my invention the axle represented at A is of the usual construction, and in referring thereto I shall use the terms "shaft" or "axle," and the hub B may be either the hub of a vehicle-wheel or that of a pulley, depending altogether to what uses the bearing is applied.

The hub B has chambers C at its ends which are closed by caps D E, respectively, said caps having screw-flanges a, which extend inwardly and adapted to engage with the screw-flanges b at the ends of the hub, whereby the caps are held firmly in place thereon. Within the chambers C are secured by any suitable means the bearing-rings F, which have semicircular grooves c, or grooves of a sufficient size in diameter and depth to receive a portion of the balls G. Opposite to the bearing-rings F are the sectional bearing-rings, each ring being formed or constructed of two sections H I, each section having a segmental groove at its corner, as shown at d, so that when together a groove will be presented to form a seat for the balls G similar in shape to the grooves of the bearing-rings F. The outer sections, H, of the bearing-ring abut against supports L M, respectively, which supports are held in position by any means found best adapted to the purpose.

A clamping-sleeve K is employed, which has dowel-pins e at its ends to enter holes in the inner sections, I, of the sectional bearing-rings to hold said inner sections in place.

Having now fully described my invention, what I claim as new, and desire to secure by Letters Patent, is—

A ball-bearing consisting of a hub having chambers at its ends, bearing-rings seated in the chambers and having semicircular grooves, sectional bearing-rings, the sections thereof having segmental grooves at their inner corners, balls located between the bearing-rings, a clamping-sleeve having dowel-pins engaging with the inner sections of the bearing-rings, supports for retaining in position the outer sections of the bearing-rings, and screw-caps engaging the ends of the hub to close the same, substantially as and for the purpose set forth.

In testimony that I claim the above I have hereunto subscribed my name in the presence of two witnesses.

CORNELIUS F. PONTIOUS.

Witnesses:
KERIN K. BROOKE,
DAVID E. SNYDER.